“Big Foot is Real", Soldiers, Oct. 1986, vol. 41, No. 10.
United States Patent [19]

Campagnuolo et al.

[11] Patent Number: 4,746,806

[45] Date of Patent: May 24, 1988

[54] MANUALLY OPERATED ELECTRICAL GENERATOR APPARATUS

[75] Inventors: Carl J. Campagnuolo, Potomac; Paul S. Clohan, Jr., Olney; John W. Hopkins, Columbia, all of Md.

[73] Assignee: United States of America as represented by the Secretary of the Army, Washington, D.C.

[21] Appl. No.: 87,944

[22] Filed: Aug. 17, 1987

[51] Int. Cl.⁴ .................................... F03G 5/06
[52] U.S. Cl. .................... 290/1 R; 290/1 E; 290/50; 310/75 B; 272/132; 272/143; 272/142
[58] Field of Search ............ 290/1 R, 1 C, 31, 37 R, 290/37 A, 38 R, 38 A, 38 B, 38 C, 48; 310/50, 67, 80, 74, 75 D, 75 B, 82, 83, 154, 156, 265, 91; 74/640, 7 R, 7 E, 7 A, 7 C; 272/192, 125, 139, 71, 900, 73, 123, 132, 129; 36/54, 120, 117, 119, 120, 121, 116; 403/108, 109; 248/676, 638, 674, 505, 507, 499, 680, 127, 351, 354.5

[56] References Cited

U.S. PATENT DOCUMENTS

| | | | |
|---|---|---|---|
| 1,707,791 | 4/1929 | Anderson | 272/134 X |
| 3,213,852 | 10/1965 | Zent | 272/73 X |
| 3,216,722 | 11/1965 | Odom | 272/73 |
| 3,240,547 | 3/1966 | Mas | 290/50 |
| 3,572,699 | 3/1971 | Niles | 272/129 X |
| 3,818,467 | 6/1974 | Willis | 290/1 E X |
| 4,060,241 | 11/1977 | Hegel | 272/132 |
| 4,084,810 | 4/1978 | Forsman | 310/75 B X |
| 4,105,314 | 8/1978 | Hughes | 310/75 B X |
| 4,195,835 | 4/1980 | Hinds et al. | 272/143 X |
| 4,222,376 | 9/1980 | Praprotnik | 272/73 X |
| 4,227,092 | 10/1980 | Campagnuolo et al. | 290/1 C |
| 4,284,272 | 8/1981 | Evans et al. | 272/143 X |
| 4,371,161 | 2/1983 | Williams | 272/142 X |
| 4,452,445 | 6/1984 | Csekes | 310/75 B X |
| 4,538,804 | 9/1985 | Zibell | 272/132 X |
| 4,612,447 | 9/1986 | Rowe | 290/1 R |
| 4,618,141 | 10/1986 | Ashworth | 272/73 |
| 4,627,610 | 12/1986 | Ishida et al. | 272/134 X |

OTHER PUBLICATIONS

"Army Tests 'Big Foot' In Effort to Lighten Force", Defense News, Aug. 18, 1986.
"Big Foot is Real", Soldiers, Oct. 1986, vol. 41, No. 10.

Primary Examiner—William M. Shoop, Jr.
Assistant Examiner—Paul Ip
Attorney, Agent, or Firm—Saul Flbaum; Guy M. Miller; Thomas F. McDonald

[57] ABSTRACT

A portable manually cranked electrical generator apparatus has a stirrup separated from the generator by a rigid support member. The support member may be adjusted vertically or angularly to accommodate differences in operator size and height while the stirrup is anchored by the operator's foot. A brace or clamp is fastened to an operator for steadying the apparatus for ease of use.

12 Claims, 6 Drawing Sheets

MANUALLY OPERATED ELECTRICAL GENERATOR APPARATUS

RIGHTS OF THE GOVERNMENT

The invention described herein may be manufactured, used and licensed by or for the United States Government for Governmental purposes without payment to us of any royalty thereon.

BACKGROUND OF THE INVENTION

1. Field of the Invention

The present invention is related to manually cranked power sources or generators and, more particularly, is directed towards a novel structure designed for ease of manual operation of these generators.

2. Description of the Prior Art

Manually cranked emergency power sources for generating electrical energy are well known. Early type manually cranked power sources have been used, for example, to directly power field radios or other similar equipment. However, the prior art manually cranked power sources have enjoyed limited usefulness as a result of their excessive weight and their inability to generate any significant amount of power. The generator described in U.S. Pat. No. 4,227,092 overcomes the weight and power generating problems but must also be supported in an efficient and economical way to allow for ease of operation. In order for its operation in the field to be made efficient and practical, a portable electrical generating apparatus is required that is also lightweight and easy to operate.

It therefore may be appreciated that there is a great need for manually cranked power sources that permit an individual to anchor the power source while allowing simultaneous manual cranking of the generator.

OBJECTS AND SUMMARY OF THE INVENTION

It is therefore a primary object of the invention to provide a portable manually cranked electrical power generator which allows for ease of operation of the generator.

Another object of the invention is to provide a portable electrical generating apparatus that is vertically adjustable.

A still further object of the invention is to provide a portable manually cranked electrical generating apparatus that is foldable against the generator for storage or can be positioned vertical or at an angle to vertical to allow for ease of cranking.

The foregoing and other objects are attained in accordance with one aspect of the invention through the use of a manually cranked generator with an extension tube having one end attached to a stirrup which the operator places his foot through to steady the apparatus during cranking. Another aspect of the invention comprises an extension tube which allows the operator to adjust the height for ease of operation.

In accordance with more specific aspects of the present invention, the generator is attached to a support tube, with a stirrup on the bottom and a hinge mechanism in the middle.

DETAILED DESCRIPTION OF THE PREFERRED EMBODIMENT

Figure 1:
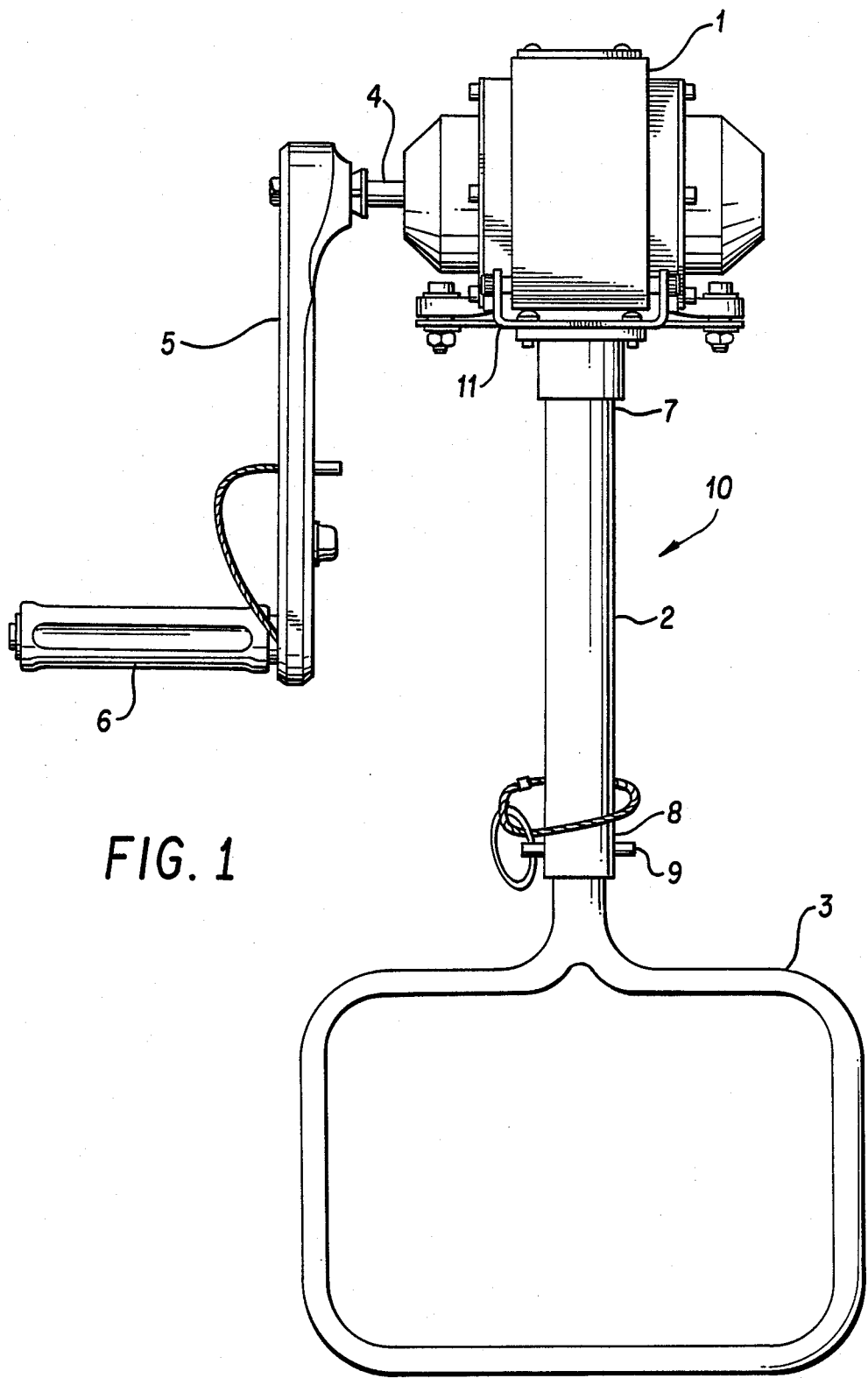
FIG. 1 shows a front view of a portable manually cranked electrical generator apparatus according to an embodiment of the present invention.

Referring now to FIG. 1 there is illustrated a portable manually cranked electrical generator apparatus 10 comprising an electrical power source 1, support member 2, and stirrup 3. A power source or manually cranked generator similar to that depicted in FIG. 1 is fully described in U.S. Pat. No. 4,227,092 issued to Campagnuolo et al. and is hereby incorporated by reference. A low speed drive shaft 4 extends through the power source 1. Secured to the end of the low speed drive shaft 4 is a cranking lever 5 that has a hand grip 6. Hand grip 6 is adapted to be manually rotated by a user, and the motion is transmitted via lever 5 to the low speed drive shaft 4.

Support member 2 has one end 7 securely mounted to a mounting plate 11 of power source 1. The support member 2 may be made of aluminum or any other suitable light weight rigid material. It may be tubular, rectangular, solid or hollow as desired. The second end 8 of support member 2 is fastened to a stirrup 3. The stirrup should be appropriately sized to accommodate a shoe or boot. The stirrup can be permanently attached to support member 2 or can be mechanically engageable with support member 2. FIG. 1 shows the stirrup slideably insertable into the second end 8 of support member 2 and secured by a pin 9 so that it can be removed. By being able to demountably attach the stirrup 3 from support member 2, one may more easily pack and transport the apparatus.

Figure 2:
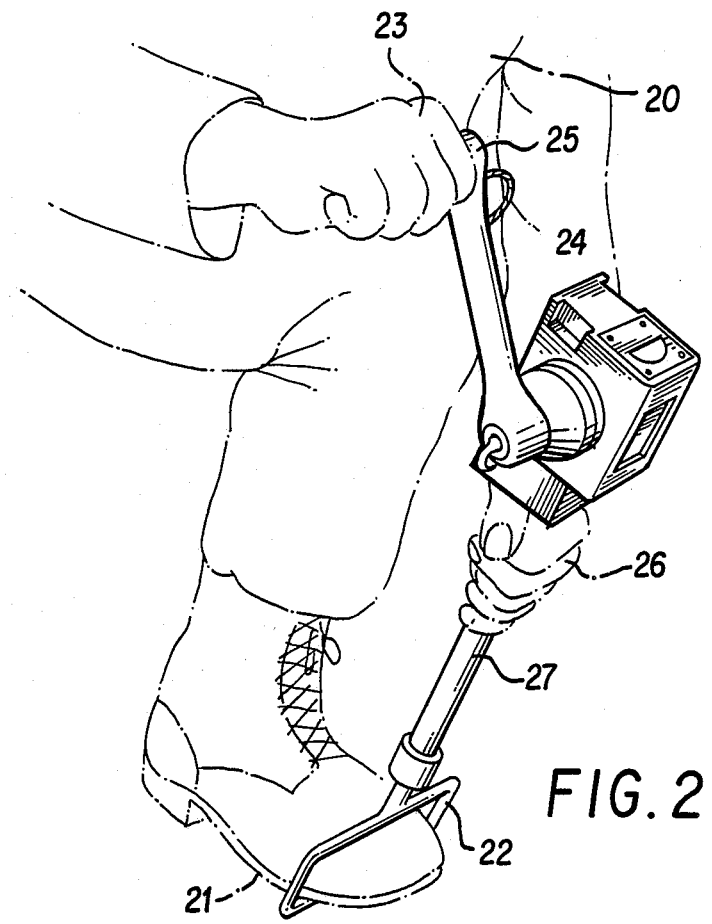
FIG. 2 shows a picture illustrative of how the apparatus of FIG. 1 is typically operated.

The operation of the portable hand-cranked power source is thus made easier through the use of this structure. As shown in FIG. 2, an operator 20 places his foot 21 through the stirrup 22 in order to anchor the unit during cranking. The operator 20 uses his first hand 23 for cranking the crank lever 24 using hand grip 25 while his other hand 26 is placed on the support member 27 to steady the apparatus during cranking.

Figure 3:
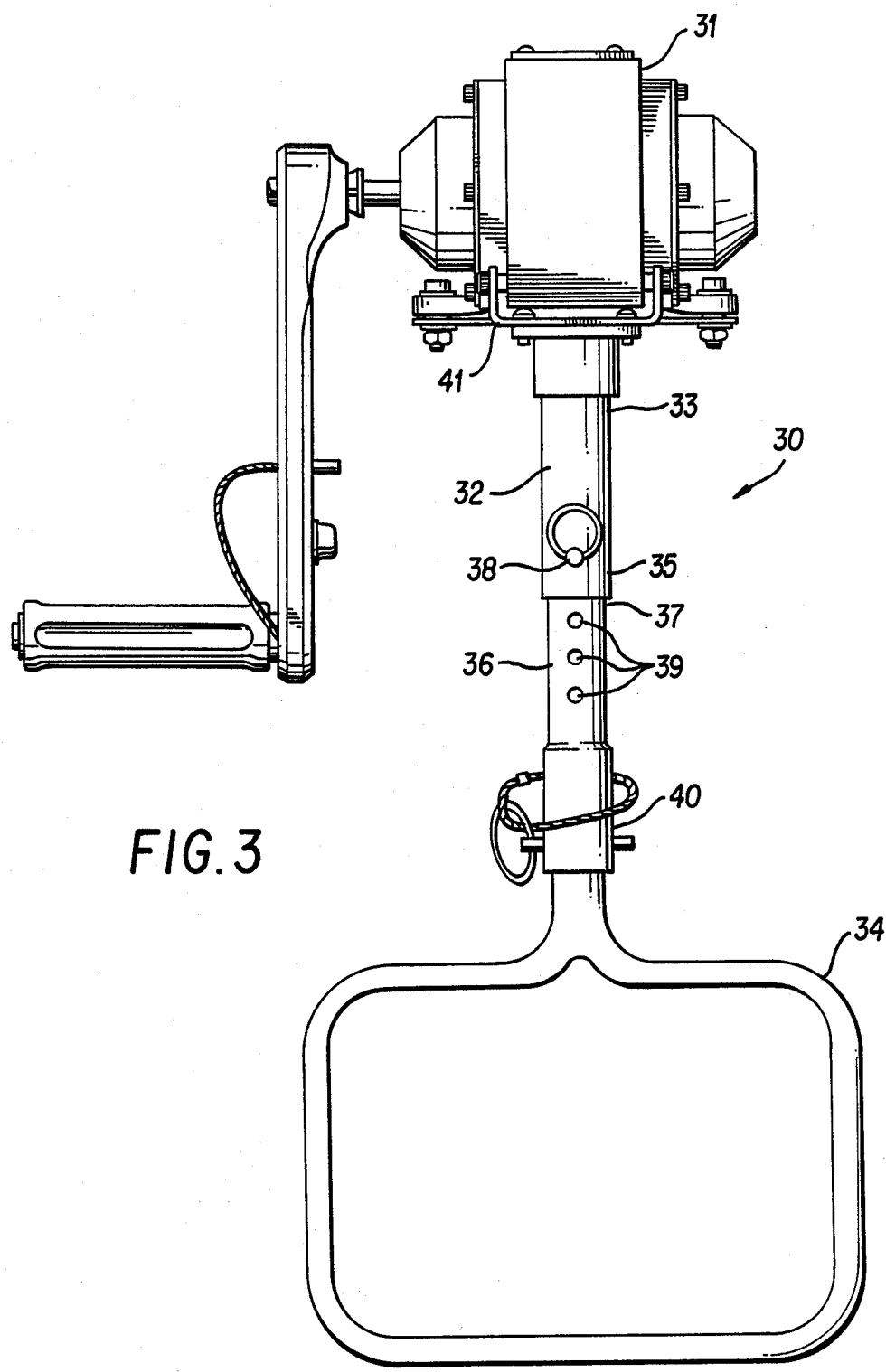
FIG. 3 shows a front view of a portable manually cranked electrical generator apparatus according to another embodiment of the present invention.

To better accommodate differences in user size and height, a vertical adjustment feature may be included as part of the support structure. FIG. 3 shows a portable hand-cranked electrical generator support apparatus 30 that has a first support member 32 with a first end 33 securely mounted to a mounting plate 41 of power source 31. A second support member 36 has a first end 37 designed to slideably insert into the second end 35 of support member 32. A pin 38 is used to adjustably secure support member 32 with support member 36 by extending through a hole in support member 32 and any one of a plurality of longitudionally aligned holes 39 in support member 36. Again, the stirrup 34 can be permenently attached to support member 36 or it can be slideably insertable into the second end 40 of support member 36 allowing for easy removal.

Figure 4:
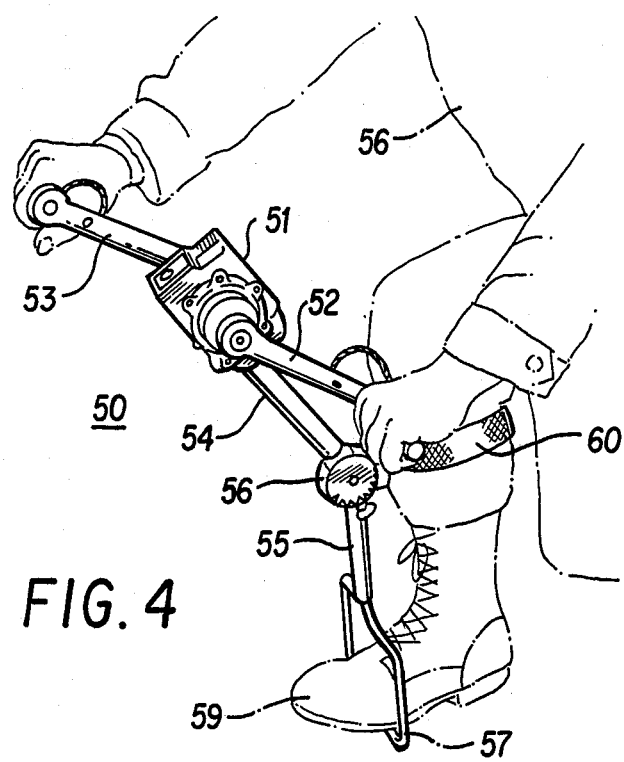
FIG. 4 shows a picture illustrative of the operation of a portable electrical apparatus of still another embodiment of the present invention.

Another embodiment of the present invention employs a hinge mechanism shown in FIG's 4 through 6. In FIG. 4 a portable manually cranked electrical generator apparatus 50 has a power source 51 and two cranking levers 52 and 53. The power source 51 is supported by use of a first support member 54, a second support member 55, a hinge mechanism 56 connected between each of the two support members 54 and 55, and a stirrup 57. The apparatus can be folded at the hinge mechanism 56 for storage or can be positioned vertical or at an angle to vertical to allow for ease of cranking.

A resilient U-shaped metal leg brace or clamp may be used to fasten the apparatus to an operator leg in order to free the users second hand for cranking. FIG. 4 shows an operator 58 using the apparatus 50 with both hands. The apparatus 50 is anchored by the user placing his foot 59 through the stirrup 57 and is steadied by the user through the use of the resilient U-shaped metal brace or clamp 60.

Figure 5:
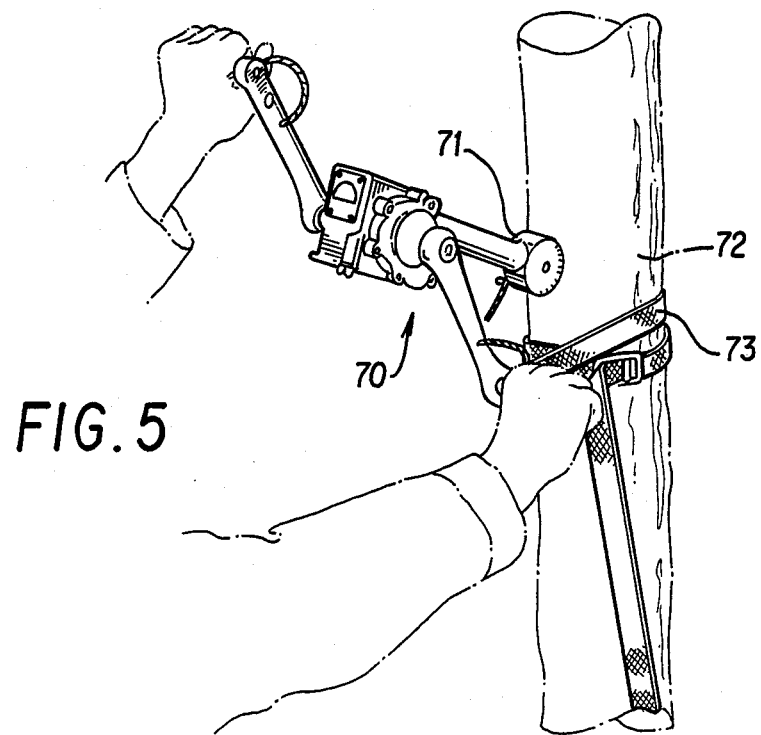
FIG. 5 shows a picture illustrative of how the apparatus of FIG. 4 may be operated while attached to a fixed object.

FIG. 5 shows a support apparatus 70 folded to the proper angle and a hige mechanism 71 locked to prevent movement, so that the apparatus may be anchored to a suitably sized stationary object 72, such as a tree, using a strap 73.

Figure 6:
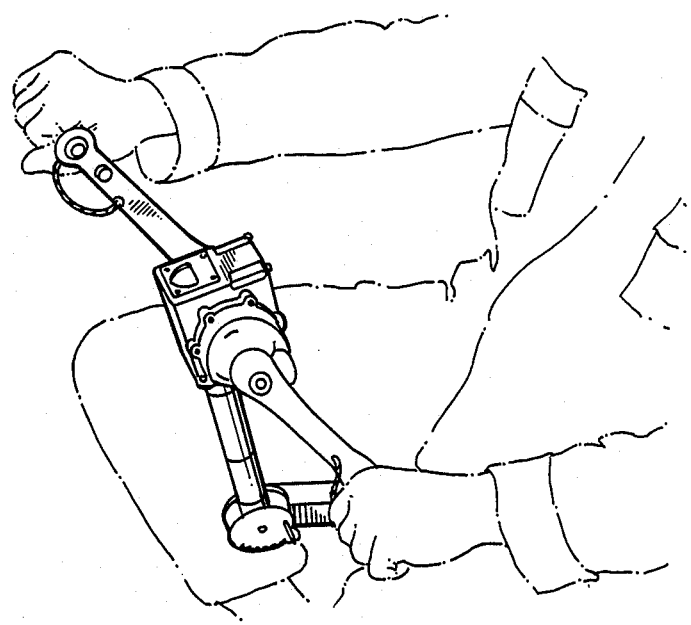
FIG. 6 shows another picture illustrative of how the apparatus of FIG. 4 may be operated.

FIG. 6 shows the support apparatus of FIG. 4 anchored during cranking by the operator sitting on the stirrup 57 of the apparatus.

Figure 7:
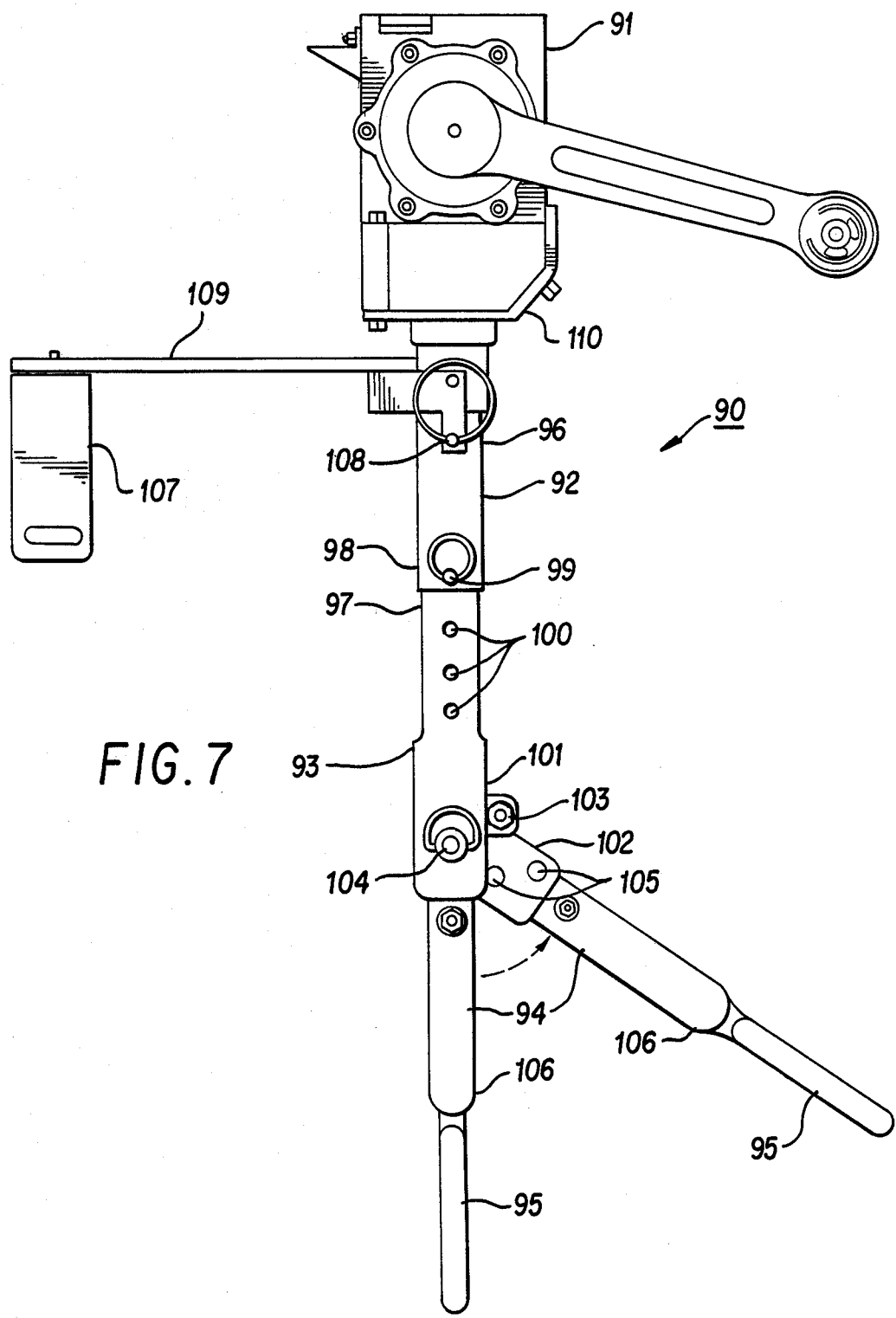
FIG. 7 shows a side view of a portable manually cranked electrical generator apparatus according to still another embodiment of the present invention.

FIG. 7 shows a side view of a portable manually cranked electrical generator apparatus 90 that comprises an electrical power source 91, a first rigid support member 92, a second rigid support member 93, a third rigid support member 94, and a stirrup 95. Support member 92 has a first end 96 securely mounted to a mounting plate 110 of the power source 91. Support member 93 has a first end 97 that slideably inserts into the second end 98 of support member 92. A pin 99 is used to adjustably secure support member 92 with support member 93 by extending through a hole in support member 92 and any one of a plurality of adjacent longitudinally aligned holes 100 in support member 93. This feature allows the support structure to be adjusted vertically.

The second end 101 of support member 93 is pivotly attached to a first end 102 of support member 94 at hinge 103. A pin 104 is used to adjustably secure the first end 102 of support member 94 in an angular relation to the second end 101 of support member 93. For illustration, support member 94 is shown in two positions. The pin 104 extends through a hole in support member 93 and any one of a plurality of adjacent holes 1205 aligned in an arch in the first end 102 of support member 94.

The stirrup 95 may be permanently secured to support member 94 or it may be demountably attached to the second end 106 of support member 94.

A resilient U-shaped brace or clamp 107 may be used to steady the apparatus 90 during two hand operation. The U-shaped brace 107 is held to the support apparatus 90 through the use of a cantilivered arm 109 which is demountably attachable to the support apparatus 90 at support member 92 using pin 108. The brace 107 is placed over the operator's leg, thereby freeing the operator for two hand operation. The embodiement of FIG. 7 provides the operator flexibility of positioning for ease of operation.

Figure 8:
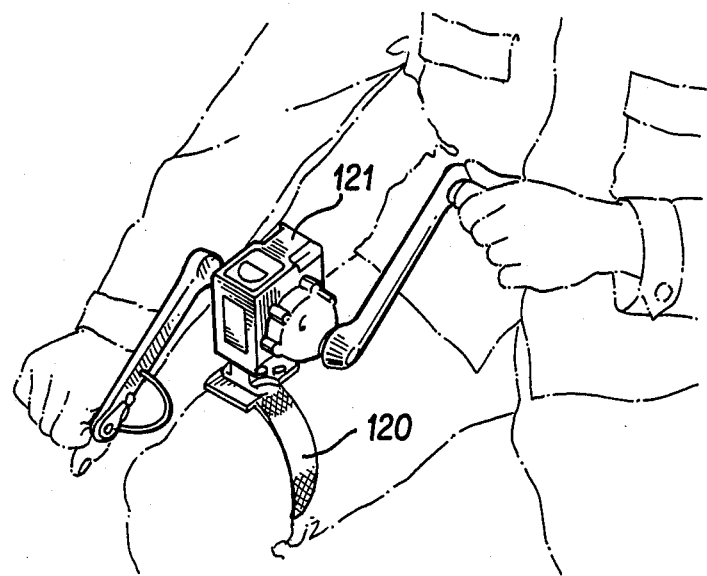

A resilient U-shaped leg brace or clamp may also be used independently of the support structure as shown in FIG. 8. The brace 120 is attached to the power source 121 and is placed around the operator's leg in order to anchor the apparatus during operation.

We wish it to be understood that we do not desire to be limited to the exact details of construction shown and described as it is obvious the concept of using a support structure with a stirrup may be configured using various types of materials or adjusting means.

We claim:

1. A portable manually cranked electrical generator apparatus comprising:
    a manually cranked generator;
    a rigid support member having a first end attached to said manually cranked generator and a second end:
    a rigid stirrup fixedly attached to the second end of said rigid support member and sized to accommodate an operator's foot so that the operator anchors the apparatus by placing his foot through said stirrup while simultaneously operating said manually cranked generator.

2. The portable manually cranked electrical generator apparatus of claim 1 wherein said support member comprises:
    a rigid tube having first and second ends.

3. The portable manually cranked electrical generator apparatus of claim 1 wherein said support member comprises:
    a first rigid tube having a first end attached to said generator and a second end;
    a second rigid tube having a first end slideably insertable with said second end of said first rigid tube and a second end, whereby the length of said support member may be adjusted.

4. A portable manually cranked electrical generator apparatus comprising:
    a manually cranked generator;
    hinge means:
    a rigid stirrup sized to accommodate an operator's foot;
    a first rigid support member having one end fixedly attached to said generator and the other end fixedly attached to said hinge means;
    a second rigid support member having one end fixedly attached to said hinge means and the other end attached to said rigid stirrup;
    said hinge means angularly adjustable so that said first rigid support member is angularly adjustable in relation to said second rigid support member; whereby said rigid stirrup is used to anchor said apparatus while said generator is being operated.

5. The portable manually cranked electrical generator apparatus of claim 4 further comprising:
    vertical adjusting means connected to said first rigid support member for lengthening the support apparatus.

6. The portable manually cranked electrical generator apparatus of claim 5 wherein said vertical adjusting means comprises;
    a third rigid support member having one end slideably insertable into said first support member and a second end fixedly attached to said hinge member.

7. The portable manually cranked electrical generator apparatus of claim 4 further comprising:
    means demountably attachable to said apparatus for fastening said apparatus to an operator, whereby the operator anchors the apparatus by placing his foot through said stirrup and by placing said fastening means around his leg, thereby providing means of operation of said manually cranked generator.

8. The portable manually cranked electrical generator apparatus of claim 7 wherein said fastening means comprises;
    a resilient U-shaped metal clamp.

9. A portable manually cranked electrical generator apparatus comprising:
    a manually cranked generator;
    a first rigid support member having a first end attached to said generator and a second end;
    a second rigid support member having a first end engaged with the second end of said first support member and a second end;
    first securing means for adjustably positioning the first end of said second support member with the second end of said first support member;
    a third rigid support member having a first end pivotly attached to the second end of said second support member and a second end;
    a second securing means for adjustably positioning the first end of said third support member in an angular relation to the second end of said second support member;
    a stirrup demountably attachable to the second end of said third support member; and
    means connected to said apparatus for fastening said apparatus to an operator, whereby the operator anchors the apparatus by placing his foot through said stirrup and by placing said fastening means around his leg, thereby providing means of operation of said manually cranked generator.

10. The portable manually cranked electrical generator apparatus of claim 9 wherein said fastening means comprises;
    a resilient U-shaped metal clamp.

11. The portable manually cranked electrical generator apparatus of claim 9 wherein said fastening means comprises:
    a strap.

12. A portable manually cranked electrical generator apparatus comprising:
    a manually cranked generator;
    a resilient U-shaped metal clamp fixedly attached to said manually cranked generator for clamping around an operator's leg, whereby said manually cranked electrical generator apparatus is anchored during operation of the manually cranked generator.

* * * * *